No. 661,216. Patented Nov. 6, 1900.
F. B. JOHNSON.
GUARD FINGER AND FINGER BAR.
(Application filed Mar. 16, 1900.)
(No Model.)
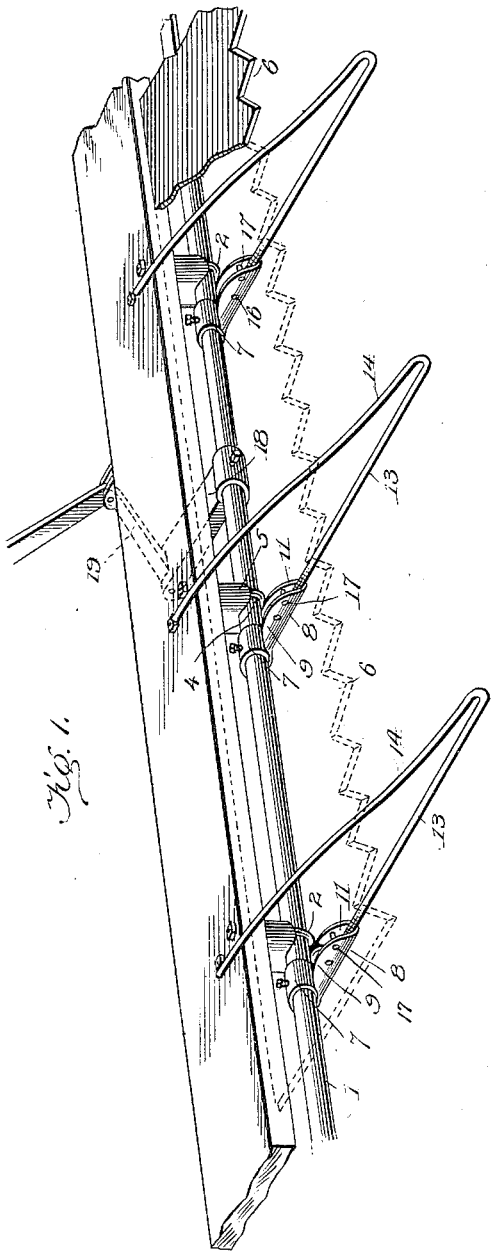
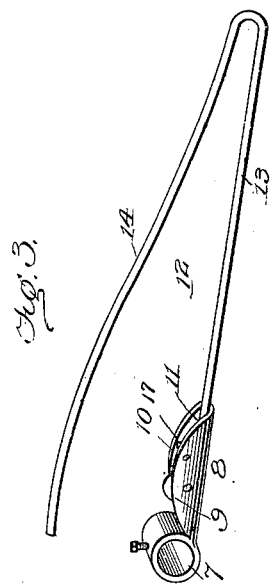
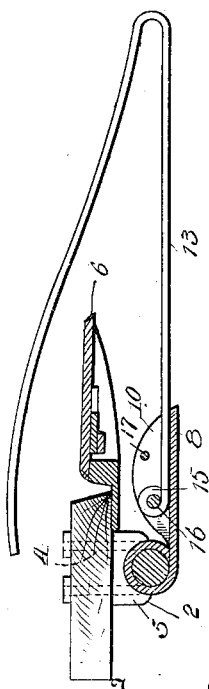
Witnesses
Harry S. Rohrer
F. M. Clellan
Inventor
Floyd B. Johnson
By Victor J. Evans
Attorney

UNITED STATES PATENT OFFICE.

FLOYD B. JOHNSON, OF ABERDEEN, SOUTH DAKOTA.

GUARD-FINGER AND FINGER-BAR.

SPECIFICATION forming part of Letters Patent No. 661,216, dated November 6, 1900.

Application filed March 16, 1900. Serial No. 8,945. (No model.)

*To all whom it may concern:*

Be it known that I, FLOYD B. JOHNSON, a citizen of the United States, residing at Aberdeen, in the county of Brown and State of South Dakota, have invented new and useful Improvements in Guard-Fingers and Finger-Bars, of which the following is a specification.

This invention relates to guard-fingers and finger-bars for harvesters, and has for its object to provide a series of guard-fingers adapted to lift or convey bunched and fallen grain to the cutting apparatus and convey it to the platform or carrying apparatus above.

With this object in view my invention consists in arranging an oscillating shaft below the cutting apparatus, on which are arranged a plurality of grooved shoes, each carrying a guard-finger which is journaled to a pin arranged across the slot and a stop for limiting the upward movement of the guard-finger.

My invention further consists in the parts and combinations of parts, as will be described hereinafter and recited in the claims.

In the drawings, Figure 1 represents a fragmentary view of a portion of a harvester to which my invention is attached. Fig. 2 is an end view of the same, and Fig. 3 is a detail perspective view of one of the shoes and guard-finger or grain-lifter.

Referring now to the drawings by reference-numerals, 1 designates a shaft journaled in bearings 2, comprising yokes 4, connected to the front end of a harvester and carrying sleeves 5, whereby the said shaft is rotatably or oscillatorily secured, but held against displacement. This shaft is preferably secured in rear of the cutting mechanism and adjasent thereto; but as the cutting mechanism forms no part of my invention I will designate it in its entirety by the reference-numeral 6. The shoes are rigidly positioned on the shaft 1 and arranged, preferably, equidistantly apart, and each shoe comprises a sleeve 7, keyed to the shaft 1 in any suitable manner and from which projects a forwardly-extending arm or shoe 8, provided on each edge with upwardly-turned flanges 9 and 10 to form a groove or recess 11 for the reception of the guard-finger and grain-lifter 12.

The guard-finger comprises a straight shank 13, bent at its free end to constitute an upwardly and rearwardly extending spring-guard 14, which projects over the cutting mechanism, so that the grain will be guided upon the front platform or a conveyer provided to carry it to a suitable receptacle on the machine. The rear end of the shank 13 rests in the recess or groove 11 of the shoe and terminates in an eye 15, which is loosely engaged by a transverse pin 16, so that each finger can be independently raised by any inequality of the ground; but an excessive upward movement of the finger will be prevented by the stop 17, comprising a transverse pin rigidly secured to the two flanges and bridging the shank 13 in front of its pivotal connection.

In order to provide means for raising the entire series of fingers, I arrange an arm 18 rigidly to the shaft 1 and engage said arm by a bell-crank lever 19, the handle of which can be grasped by the driver on the machine.

It will be noticed that the fingers will effectually protect the cutting mechanism of the harvester and that each and every one of said fingers can be raised independently of the others by any inequality of the ground; but should it be found desirable to raise the entire series this can be accomplished through the medium of the arm and bell-crank lever.

Further attention is directed to the peculiar connection between the shoe and the finger, whereby the side flanges of said shoe to prevent any lateral movement of said fingers.

While I have described in detail what appears to me to be the very best means of accomplishing the desired result, I would have it understood that I reserve the right to make such slight changes and alterations in the non-essential features of my invention as would suggest themselves or which might be found desirable without departing from the spirit thereof. For instance, any suitable bearings might be substituted for those shown and described to support the shaft 1, and a different arrangement of lever and arm might be made, although I prefer the construction shown on account of the cheapness and simplicity.

I claim—

1. The combination with the cutting apparatus of a harvester, of a transverse shaft arranged in rear thereof and having a plurality of shoes rigidly secured thereon, said shoes being provided with grooves or recesses, and a plurality of forwardly-extending and independently-moving guard-fingers mounted in the grooves of the shoes.

2. The combination with the cutting apparatus of a harvester; of a shaft arranged in rear thereof, a series of independent shoes rigidly connected thereto and having side flanges to form grooves, guard-fingers mounted in said grooves and adapted to move independently, and a transverse stop connected to the side flanges of each shoe to limit the upward movement of the respective fingers.

3. The combination with the cutting apparatus of a harvester; of a transverse shaft arranged in rear thereof, sleeves rigidly connected to said shaft, a grooved extension projecting from each sleeve, a pivotally-mounted guard-finger in the groove of each extension, and a transverse pin arranged in said groove in front of the pivotal point of the guard-finger to limit the upward movement of said guard-finger.

In testimony whereof I affix my signature in presence of two witnesses.

FLOYD B. JOHNSON.

Witnesses:
  A. E. BOYD,
  ISAAC LINCOLN.